Feb. 1, 1966   B. J. SCHWEITZER   3,232,667
TRACTOR MOUNTED DUMP BED
Filed Nov. 6, 1963   2 Sheets-Sheet 1

INVENTOR.
BILLY J. SCHWEITZER
BY
John H. Widdowson
ATTORNEY

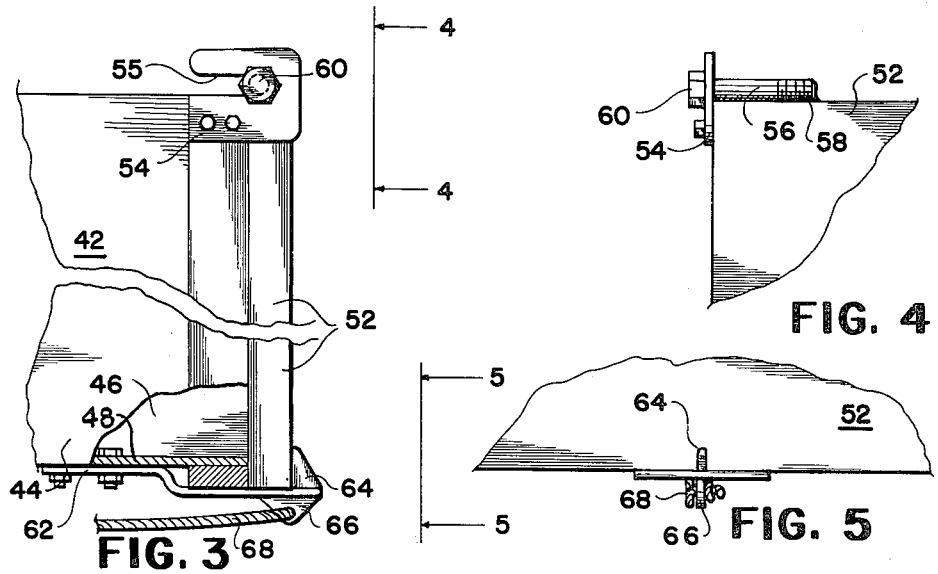
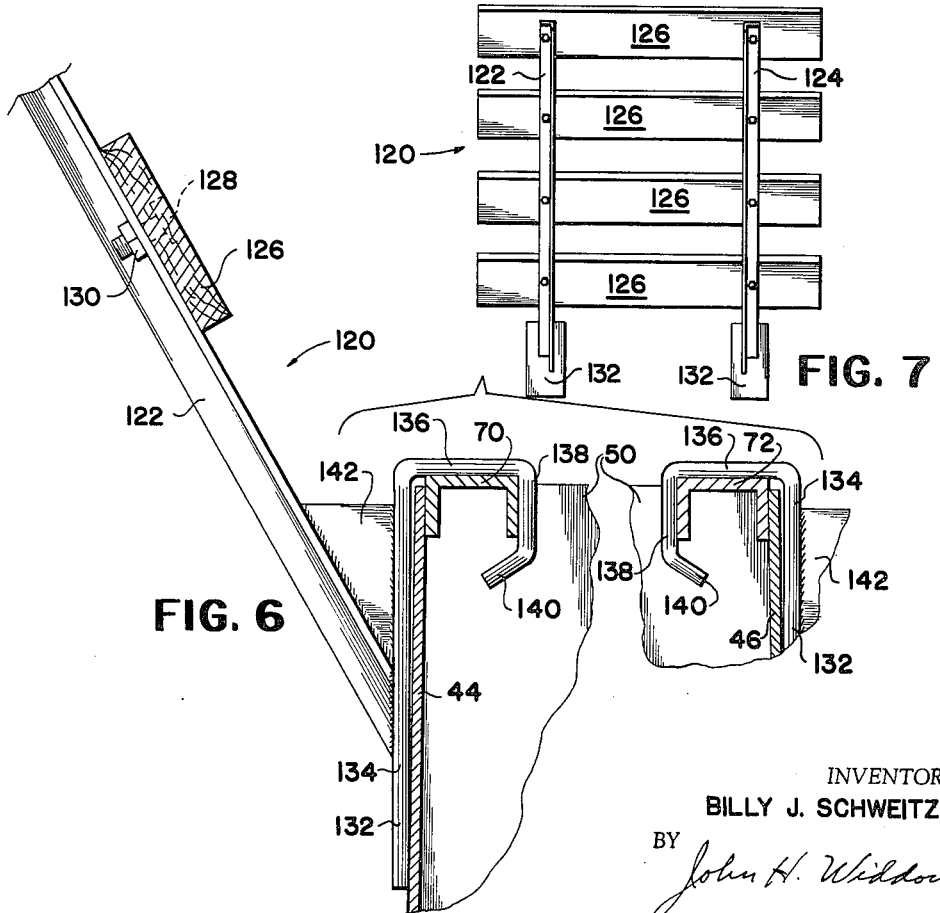

United States Patent Office 3,232,667
Patented Feb. 1, 1966

3,232,667
TRACTOR MOUNTED DUMP BED
Billy J. Schweitzer, Wichita, Kans., assignor to Universal Pulleys Co., Inc., Wichita, Kans., a corporation of Kansas
Filed Nov. 6, 1963, Ser. No. 321,796
5 Claims. (Cl. 298—21)

This invention relates to dump bed means and to means for mounting same. In a more specific aspect the invention relates to the construction of dump bed means and mounting means for the dump bed means so that same can be used with farm tractors and other implements or vehicles. In a still more specific aspect the invention relates to dump bed means and means for mounting same on a farm tractor or the like having power lift means wherein a portion of the means for mounting the dump bed is operatively connected to the power lift means to be moved thereby when moving the dump bed from a carrying to a dumping position. In another aspect the invention relates to means for extending the height of walls of a dump bed or the like to thereby enlarge the carrying capacity thereof and more specifically to bed extension means and means for mounting same on a dump bed or the like.

Various dump beds for trucks and other vehicles are known to the art. In addition, means for mounting attachments or the like on tractors or other vehicles are also also known to the art. Many of the dump bed structures of the prior art cannot be easily mounted on a tractor or the like without substantial addition of structures to the tractor which results in relatively great expense to the farmer, contractor or others using the tractor or substantial modification of the tractor itself which makes same unsuitable for other uses. In other instances it is difficult to remove the dump structure from the vehicle when the vehicle is desired for other uses. In some prior dump bed means there is no provision for enlargement of the bed for large loads.

In accordance with the present invention the new dump bed means and means for mounting same are provided which include means defining a receptacle adapted to receive material or the like for transporting same. Frame means are provided which have a portion movably mounting the means defining the receptacle and linkage means are provided having a portion positioned in spaced relation to that portion of the frame means which mounts the receptacle with the portion of the linkage being operatively connected to the means defining the receptacle so that movement of the linkage means causes movement of the means defining a receptacle.

In another aspect, the invention relates to new means for extending the height of a wall of a dump bed or the like which includes support means positionable in a generally upright position and means connected to the support means and defining therewith wall means. Mounting means are operatively connected to an edge portion of the wall means and are connectible to a wall of a dump bed or the like to extend the height of the dump bed, the mounting means preferably having a portion shaped and adapted to accommodate a portion of the dump bed when mounted thereon.

Accordingly, it is an object of the invention to provide new dump bed means and means for mounting same.

Another object of the invention is to provide a new construction of dump bed and means for mounting same so that the dump bed can be easily mounted on vehicles such as tractors or the like.

A further object of the invention is to provide new dump bed means and means for mounting same on a vehicle having power lift means wherein the dump bed means and mounting means associated therewith are operatively connected to the vehicle with a portion being connectible to the power lift means of the vehicle so that operation of the power lift means positions the dump means in either a transporting or dumping position.

A still further object of the invention is to provide new combination dump bed means and means for extending the height thereof when increased capacity is desired.

A further object of the invention is to provide new means for extending the height of a dump bed or the like to thereby increase the carrying capacity thereof.

A further object of the invention is to provide new means for extending the height of a dump bed or the like wherein mounting means are provided which are removably connectible to a portion of a wall of the dump bed or the like to form a substantial continuation of the dump bed when mounted thereon.

Various other objects, advantages, and features of the invention will become apparent to those skilled in the art from the following description taken in conjunction with the accompanying drawings, in which:

FIG. 3 is an enlarged, partial side elevation view illustrating the rear end portion of the dump bed of FIG. 1 and illustrating the mounting and lock means for the tail gate.

FIG. 4 is a view from the rear of the tail gate of the dump bed of the invention taken along the line 4—4 of FIG. 3.

FIG. 5 is an enlarged end view showing a latch mechanism usable with the tail gate and taken along the line of 5—5 of FIG. 3.

FIG. 6 is an enlarged cross section view, partially broken away, through the side walls of the dump bed means and the bed extension means of the invention and illustrating mounting of the bed extension means on the wall of the dump bed.

FIG. 7 is an elevation view on a smaller scale illustrating a preferred specific embodiment of the bed extension means of the invention.

Figure 1:
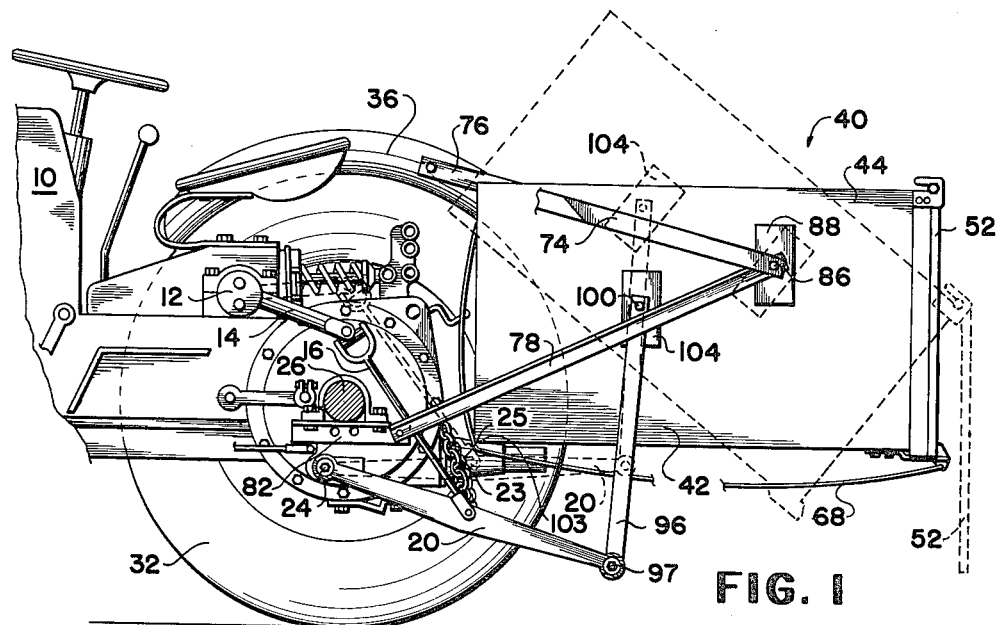
FIG. 1 is a side elevation view of a preferred specific embodiment of the dump bed and means for mounting same of the invention shown positioned on a tractor or the like with one wheel of the tractor being removed.

The following is a discussion and description of preferred specific embodiments of the new dump bed and means for mounting same and of the bed extension of the invention, such being made with reference to the drawings whereon the same reference numerals are used to indicate the same or similar parts and/or structure. It is to be understood that such discussion and description are not to unduly limit the scope of the invention.

Referring now to the drawings in detail, the dump bed means of the invention is used with a vehicle, such as the tractor shown generally at 10, and the vehicle is preferably provided with power lift means. The power lift means illustrated in FIGS. 1 and 2 includes a shaft 12 which is operatively connectible to power means of the tractor in a usual and common manner to provide for rotation of the shaft and arms. The arms are connected to and project from the ends of the shaft 12, a single arm 14 being illustrated in FIG. 1, it being understood that a like arm is positioned at the other end portion of shaft 12. The outer end portion of arms 14 are connected to one end portion of link members 16 and 18 and the other end portion of the link members are connected to intermediate portions of lift arms 20 and 22, respectively.

The lift arm 20 is pivoted at 24 to the tractor frame beneath axle 26 and in a similar manner the lift arm 22 is pivoted at 28. Chains 23 and 25 can be connected to the lift arms 20 and 22, respectively, and to the tractor frame to limit movement of the lift arms. In operation, the shaft 12 is rotated by the power means of the tractor and causes movement of the arms 14 which in turn move the linkage members 16 and 18 to pivot the link arms 20 and 22 about the pivotal mountings 24 and 28 therefor. The lift arm structure and movement of same as shown and described can be of any suitable construction and that illustrated and described is of a typical Ford tractor. The tractor further includes wheels or tires 30 and 32 which are operatively connected to the axle 26 in any suitable manner to support the vehicle. Guards or fenders 34 and 36 are mounted on the tractor 10 and positioned adjacent the tires 30 and 32, respectively.

The dump bed and means for mounting same are shown generally at 40 and preferably includes an elongated and box-like housing or receptacle 42 having sides or walls 44 and 46 of like construction secured on the lower edges to a bottom 48. A front end or wall 50 is secured to and extends between the sides 44 and 46 and also can be secured to the bottom 48 to project upwardly therefrom.

The receptacle 42 desirably has a rear end or tail gate 52 which is preferably hingedly connected in the upper end portion to the upper edge of the rear end portions of the sides 44 and 46. As best illustrated in FIGS. 3 and 4 of the drawings, a hinge member 54 can be mounted on the upper edge of wall 44 and secured thereto by bolts or other suitable means. The hinge member 54 has an elongated horizontally extending slot 55 which opens at the front edge thereof above the sides of the receptacle. A bolt 56 is provided and the shank 58 thereof is secured by welding, etc. to the upper edge of the tail gate 52 with the head 60 of the bolt projecting from and in spaced relation to the side of the tail gate. When mounting, the tail gate is placed in a generally horizontal plane and the shank 58 of bolt 56 is received in slot 55 of hinge member 54 and moved rearwardly and downwardly to thereby hingedly mount the tail gate on the side wall. In a similar manner the tail gate is hingedly connected to the wall 46. This hinge structure substantially eliminates inadvertent removal of the tail gate during hauling of a load.

Cooperating latch means are preferably provided with the tail gate 52 and another portion of the receptacle so that the tail gate can be retained in the closed position. For this purpose a plate or latch member 62 of spring steel or other suitable material can be mounted in one end portion on the bottom 48 of the receptacle 42 and the other end portion thereof can project from the rear edge of the bottom 48 and the tail gate 52. The outermost end of the plate or latch member 62 has a flange or catch 64 thereon projecting upwardly and positioned to engage the lower edge of tail gate 52. A flange 66 can be provided on the lower rear portion of plate or latch member 62 and a lanyard, rope or the like 68 is connected thereto and to the front wall 50 or to the tractor so that the lanyard can be pulled by the tractor operator to release the catch 64 and permit the tail gate to open. When closing the tail gate 52, the lower edge of the tail gate will engage the tapered rear edge of the catch 64 and force same downwardly to permit the tail gate to be moved to a fully closed position and the catch 64 will then move upwardly to hold the tail gate in the closed position.

The receptacle 42 is desirably constructed so that bed extension means described more fully hereinafter can be mounted on the sides 44 and 46 of the receptacle. For this purpose two elongated channels 70 and 72, FIG. 6, are secured to the upper end portion of sides 44 and 46, respectively, and preferably the base portions of the channel 70 and 72 project inwardly at right angles to the sides 44 and 46 as best illustrated in FIG. 6. The channels 70 and 72 can be of any suitable length and preferably extend along the entire length of sides 44 and 46.

Frame means for mounting the receptacle 42 are preferably provided and operatively connected to the receptacle. In the preferred specific embodiment of the invention shown in the drawings the frame means includes two separate frames positioned at opposite sides of the receptacle and each of the frames preferably includes an elongated strip of strap iron or the like 74 and 76 which has one end portion positioned in abutting engagement with one end portion of angle irons 78 and 80, respectively. The other end portion of strap iron 74 is secured to fender 34 and the other end portion of the angle iron 78 is secured to a support member 82 of the tractor or the like and in a similar manner the strap iron 76 is secured to the fender 36 and angle iron 80 is secured to support 84. The frame members together with the mounting of same on the tractor provides a substantially A-shaped frame which is quite rigid and is sufficiently strong to support the receptacle 42. The end portions of the frame members 74 and 78 which are connected together are in turn pivotally connected by a pivot or the like 86 to the side 44 of the receptacle 42 and a plate or the like 88 can be provided on side 44 at the point of mounting on the frame means. In a similar manner the frame members 76 and 80 can be connected by pivot 90 to side 46 through a plate or the like 92. Preferably, the pivots 86 and 90 are connected to the receptacle 42 at the rear end portion thereof as best illustrated in FIG. 1.

A spreader bar of an angle iron or the like 94 is preferably provided and extends between and is connected to the lift arms 20 and 22 and to one end portion of two linkage members 96 and 98. The connection between bar 94, the lift arms and the linkage members can be accomplished in any suitable manner, such as by welding nuts 95 to the ends of the bar and passing bolts 97 through the linkage members and lift arms into the nuts. The other end portions of the linkage members 96 and 98 are desirably pivotally connected by pivots 100 and 102, respectively, to the sides 44 and 46 of the receptacle 42 and plates or the like 104 and 106 can be mounted on the sides of the receptacle between the linkage members 96 and 98 and the sides of the receptacle. Desirably, the pivots 100 and 102 are located on the forward end portion of the receptacle 42 and in spaced relation to the pivots 86 and 90 by which the receptacle is mounted on the frame members.

In use, the frames for mounting the receptacle are secured to the tractor or the like 10 by mounting the straps 74 and 76 on the fenders 34 and 36, respectively, and by securing the angle irons or the like 78 and 80 to the frame of the tractor. The linkage members 96 and 98 are then secured to the bar 94 and the lift arms 20 and 22. The receptacle is thus easily mounted on the tractor and is ready for use.

The receptacle 42 is positionable in a generally horizontal plane for transporting materials or the like placed therein. When it is desired to dump the receptacle or dump bed, the mechanism of the tractor is actuated to cause rotation of the shaft 12 which moves arms 14 and moves linkage members 16 and 18 in an upward direction to cause upward movement of the outer ends of the lift arms 20 and 22 and thereby elevate the forward portion of the receptacle 42 and cause pivotal movement of same about the pivots 86 and 90 connecting the frame to the receptacle. The receptacle is thus moved from the transporting position shown in the solid lines to the dump position shown in the broken lines in FIG. 1 and, when the catch 64 of latch 62 is moved, the tail gate 52 will swing outwardly or pivot about the bolt 56 and move to the position shown in the broken lines in FIG. 1 and thereby permit discharge of sand, grain or other materials carried by the receptacle. The receptacle 42 is lowered and placed into a transporting position by gravity or, with some tractors, by reversing movement of shaft 12 which causes lowering of the lift arms 20 and 22. The forward portion of the receptacle bottom 48 can rest on the power take off 103 of the tractor or on other suitable support structure.

Figure 2:
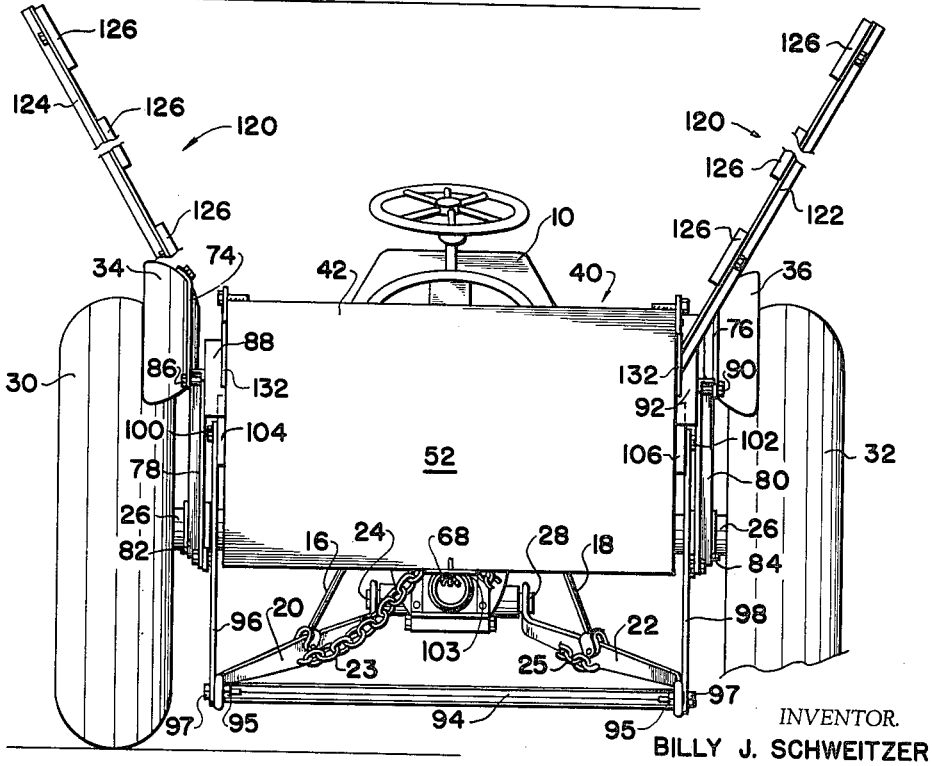
FIG. 2 is a view from the rear end of the dump bed and means for mounting same shown in FIG. 1 and additionally illustrating positioning and mounting of a preferred specific embodiment of the bed extension means of the invention thereon.

Preferably, means for extending the height of the walls of the receptacle 42 are provided so that bulky and light weight loads such as hay or the like can be carried by the receptacle more efficiently and with fewer trips for the total load. For this purpose extension members are provided and are shown generally at 120 and two such extension members of like construction can be provided as best illustrated in FIG. 2. The extension members 120 preferably include two spaced and generally parallel angle irons or the like 122 and 124 and frame members or means associated therewith to define with the angle irons a wall or the like. The frame means or members can be a plurality of wooden slats or boards 126 which extend transversely across the angle irons 122 and 124 and can be secured thereto by bolts 128 and nuts 130 as illustrated in FIG. 6.

Mounting means are provided with the bed extension members for securing same to sides 34 and 36 of the receptacle and the mounting means is shown generally at 132 and is preferably an integrally formed member having a base portion 134 which is elongated and has an inner surface engageable with the upper edge portions of the outer surfaces of sides 44 and 46. The mounting means also includes a ledge portion 136 which projects from the upper end of the base portion 134 at substantially a right angle thereto. In addition, the mounting members 132 preferably include an arm portion 138 which projects downwardly from the ledge portion 136 opposite from the base portion 134 and is positioned in spaced and generally parallel relation with the base portion 134 as best illustrated in FIG. 6. The end portion 140 of the arm 138 of the mounting members 132 preferably projects inwardly toward the base portion 134 and defines a lip or the like. The mounting means 132 can be secured to the supports or angle irons 122 and 124 by use of gussets 142 which are welded or otherwise secured to the base portion 134 of the mounting means 132 and to a surface of the angle iron 122 and 124. The use of the gussets 142 permits the angle irons 122 and 124 to be inclined outwardly as illustrated in the drawings and thus not only extend the height of the dump bed but also the width of the upper portion thereof between the extension members, such being best illustrated in FIG. 2 of the drawings.

In use, the bed extension member 120 can be mounted on the walls 44 or 46 of the receptacle or dump bed 42 by positioning the base portions 134 of the mounting means 132 in a substantially horizontal position on the upper edge surfaces of the walls 44 and 46 and the lips or inwardly projecting portions 140 of the arms 138 of the mounting members are then slipped underneath the projecting lower inside edges of the channel members 70 and 72 and the base portion 134 of the mounting means is then pivoted toward the outer surface of the walls 44 and 46 to place same in substantially abutting engagement therewith as illustrated in FIG. 6. This moves the angle irons 122 and 124 to an inclined position as best illustrated in FIGS. 2 and 6 and the portions 140 of the mounting means prevents inadvertent upward movement of the extension members which might inadvertently or accidentally remove the extension members. This is quite desirable since movement of loads within the bed or receptacle may exert an upward pressure on to the mounting members and the extension members would then be removed inadvertently and could cause loss of a portion of the load. It will be seen that the mounting means 132 has a portion which accommodates a portion of the wall or the like 44 or 46 to prevent inadvertent removal of the mounting means and the extension members from the wall of the bed or the like.

As will be seen from the foregoing description of the dump bed and extension members therefor, the dump bed structure can be easily and quickly mounted on or dismounted from a tractor or the like simply by connecting the frame members 74, 76, 78 and 80 to the fenders and frame of the tractor and connecting the linkage members 96 and 98 to the lift arms 20 and 22. The dump bed is thus quickly and easily mounted and is ready for use for carrying any suitable load. Where large bulky and generally light weights are involved, the bed extension members can be mounted on the walls 44 and 46 to extend the height and width of the dump bed. Use of the dump bed and extension means therefor of the invention permits greater utilization of a tractor by a farmer, contractor or others using vehicles having lift means associated therewith and it will be understood by those skilled in the art that the structure of the invention can be used with other vehicles.

While the foregoing description of the invention has been in connection with preferred specific embodiments thereof, it will be understood that this description is intended to illustrate and not to limit the scope of the invention which is defined by the claims.

I claim:

1. A dump bed and means for mounting same on a tractor or the like having power lift means at a rear portion thereof including a rotatable shaft connected to power means of the tractor and having arms projecting therefrom at the ends thereof with the outer end portion of said arms being connected to one end portion of link members and with the other end portion of said link members being connected to intermediate portions of two lift arms each of which is pivotally connected at one end to the tractor frame, said dump bed and means for mounting same comprising, in combination, an elongated hollow box-like receptacle having a generally horizontally disposed bottom, two vertically extending sides secured to and projecting upwardly from said bottom and a fixedly mounted end secured to said bottom and said sides and extending between the front ends of said sides, said receptacle having a tail gate hingedly connected in the upper end portion to the upper edge of rear end portions of said sides of said receptacle, latch means mounted on the rear end portion of said bottom of said receptacle and having a portion engageable with the lower portion of said tail gate and being operable when engaged to hold said tail gate in a closed position, means connected to said latch means to disengage same and permit opening of said tail gate, two elongated channels, said upper edge portion of each of said sides of said receptacle having one side of the respective channel secured thereto and extending therealong and with the opposite side of said channel projecting downwardly and parallel to said sides, two frames for mounting said receptacle positioned at opposite sides of said receptacle, each of said frames including a strap iron having one end portion positioned in abutting engagement with one end portion of an angle iron and forming an acute angle therewith and with the other end portion of said strap iron being secured to an upper portion of the fender of said tractor and with the other end portion of said angle iron being secured to the frame of said tractor adjacent the rear axle thereof, the rear end portion of said sides of said receptacle being pivotally connected to said frames at said one end portion of said angle iron and said strap iron, a bar extending between and connected to said lift arms of said tractor, and two linkage members, each of said sides of said receptacle having one end portion of one of said linkage members secured thereto at the forward portion thereof in spaced relation to the pivotal connection between said frames and said receptacle and the other end portion of each of said linkage members being pivotally connected to outer ends of said lift arms, said dump bed being constructed and adapted so that said receptacle can be loaded when in generally horizontal position and with said lift arms in a lowered position with said receptacle being movable to a dumping position by elevation of said lift arms to cause movement of said linkage members to elevate said front end portion of said receptacle about the pivotal connection of said frames and said rear end portion of said receptacle, said tail gate being openable to permit discharge of the contents of said receptacle.

2. The dump bed and means for mounting same on tractors or the like as defined in claim 1 additionally including two mountable dump bed extension members each including two spaced and generally parallel angle irons and a plurality of frame members positioned transverse to said angle irons and bolted to said angle irons in spaced relation to define wall means, mounting members for said bed extension members each including an elongated flat base portion engageable with the upper edge portion of said sides of said receptacle and further including a ledge portion projecting from one end of said base portion at substantially a right angle to said base portion, each of said mounting members having an arm portion projecting from said ledge portion and positioned in spaced relation to said base portion with the end portion of said arm portion opposite from said ledge portion projecting toward said base portion and terminating in spaced relation to said base portion, said mounting members receiving said upper edge portions of said sides and said channel member on said upper edge portions of said sides of said receptacle to thereby removably mount said extension members thereon, each of said mounting members having one end portion of one of said angle irons of said bed extension members secured thereto at an acute angle to said base portion thereof.

3. An extension member for the sides of dump beds or the like comprising, in combination, two spaced and generally parallel angle irons, a plurality of cross frame members positioned in spaced relation and secured to said angle irons to form therewith a wall or the like, two mounting members for said wall including an elongated flat base portion engageable with the sides of a dump bed or the like and having a ledge portion projecting from one end of said base portion at substantially a right angle to said base portion, each of said mounting members having an arm portion projecting from said ledge portion in position in spaced relation to said base portion with the end portion of said arm portion opposite from said ledge portion projecting toward said base portion and terminating in spaced relation to said base portion, said mounting member being shaped and of size to receive portions of the sides of a receptacle or the like for removably mounting said extension members thereon, each of said mounting members having one end portion of one of said angle irons of said bed extension members secured thereto at an acute angle to said base portion thereof.

4. An extension member for the side of a dump bed or the like having support means and a box mounted on said support means, each side of said box having a channel member attached on the side thereof to said box along the upper edge with the channel opening downwardly into the interior of the box, comprising, in combination, at least two upright members each having a base member engageable with a side of said box parallel thereto and a fastening member adapted to matingly receive said channel member, said fastening member having a ledge portion extending closely adjacent the base of the channel on the side of the box, a portion parallel to the opposite side of said channel, and an end portion extending beyond the side of the channel and projecting toward the side of the box.

5. A dump bed and means for mounting same on a tractor or the like having power lift means at a rear portion thereof including a rotatable shaft connected to power means of the tractor and having arm means projecting therefrom with the outer end portion of said arm means being connected to one end portion of link means and with the other end portion of said link means being connected to an intermediate portion of lift arm means pivotally connected at one end portion to the tractor frame, said dump bed and means for mounting same comprising, in combination, a box-like receptacle having a generally horizontally disposed bottom, substantially vertically extending sides mounted on and projecting upwardly from said bottom and an end mounted on said bottom and said sides and extending between the front end portions of said sides, said receptacle having a tail gate hingedly connected in the upper end portion to the upper edge of rear end portions of said sides of said receptacle, releaseable latch means with said tail gate constructed and adapted when engaged to hold said tail gate closed, each side of said box-like receptacle having a channel member attached on the side thereof to said receptacle along the upper edge with the channel opening downwardly into the interior of the box, an extension member mounted on each side of said receptacle having at least two upright members each having a base member engaging the side of the receptacle parallel thereto and a fastening member adapted to matingly receive said channel member, said fastening member having a ledge portion extending closely adjacent the base of the channel, a portion parallel to the opposite side of said channel, and an end portion extending beyond the side of the channel and projecting toward the side of the box, two frames for mounting said receptacle positioned at opposite sides of said receptacle, each of said frames including a first elongated member having one end portion positioned in abutting engagement with one end portion of a second elongated member and forming an acute angle therewith and with the other end portion of said first member being secured to an upper portion of the rear of said tractor and with the other end portion of said second member being secured to said tractor at the lower rear thereof, the rear end portion of said sides of said receptacle being pivotally connected to said frames at said one end portion of said first and second members, and a linkage member, one end portion of said linkage member secured to a side of said receptacle at a forward portion of said side and in spaced relation to the pivotal connection between said frame and said receptacle and the other end portion of said linkage member being pivotally connected to the outer end portion of said lift arm means, said dump bed being constructed and adapted so that said receptacle can be loaded when in generally horizontal position and with said lift arm means in a lowered position with said receptacle being movable to a dumping position by elevation of said lift arm means to cause movement of said linkage member to elevate said front end portion of said receptacle about the pivotal connection of said frames and said rear end portion of said receptacle, said tail gate being openable to permit discharge of the contents of said receptacle.

References Cited by the Examiner

UNITED STATES PATENTS

| | | | |
|---|---|---|---|
| 1,332,843 | 3/1920 | Johnson | 296—13 |
| 1,340,798 | 5/1920 | Scott | 298—23 |
| 1,351,436 | 8/1920 | Olsen | 298—23 X |
| 1,366,847 | 1/1921 | Stromberg | 296—13 |
| 1,407,415 | 2/1922 | Hedrick | 296—33 |
| 2,656,164 | 10/1953 | Knowlton | 298—17 X |
| 2,699,312 | 1/1955 | DiCesare | 248—235 X |
| 2,925,301 | 2/1960 | Milligan | 298—17 X |
| 3,017,155 | 1/1962 | Scarpetti | 248—235 |

FOREIGN PATENTS 1,036,553   8/1958   Germany.

BENJAMIN HERSH, *Primary Examiner.*

R. DAVID BLAKESLEE, ARTHUR L. LA POINT,
*Examiners.*